United States Patent
Yokoi

(10) Patent No.: US 10,788,799 B2
(45) Date of Patent: Sep. 29, 2020

(54) SAMPLE ANALYZING SYSTEM

(71) Applicant: Shimadzu Corporation, Kyoto-shi, Kyoto (JP)

(72) Inventor: Yusuke Yokoi, Kyoto (JP)

(73) Assignee: SHIMADZU CORPORATION, Kyoto-shi (JP)

(*) Notice: Subject to any disclaimer, the term of this patent is extended or adjusted under 35 U.S.C. 154(b) by 760 days.

(21) Appl. No.: 14/708,574

(22) Filed: May 11, 2015

(65) Prior Publication Data
US 2015/0331401 A1 Nov. 19, 2015

(30) Foreign Application Priority Data
May 14, 2014 (JP) .................. 2014-100925

(51) Int. Cl.
*G05B 15/02* (2006.01)
*G01N 35/00* (2006.01)
*G01N 1/00* (2006.01)

(52) U.S. Cl.
CPC ....... *G05B 15/02* (2013.01); *G01N 35/00712* (2013.01); *G01N 35/00871* (2013.01); *G01N 2001/007* (2013.01); *G01N 2035/0091* (2013.01)

(58) Field of Classification Search
CPC ....... G01N 35/00871; G01N 35/00712; G01N 2035/00881; G01N 2035/00891; G01N 2035/0091; G01N 2001/007; G01N 2021/0118; G01N 2203/0204; G05B 15/02
See application file for complete search history.

(56) References Cited

U.S. PATENT DOCUMENTS 6,438,200 B1 * 8/2002 Kita ............... G01N 23/223
378/44
2004/0216009 A1 * 10/2004 Kihara ............ G01N 30/88
714/37
(Continued)

FOREIGN PATENT DOCUMENTS

CN    102937920 A    2/2013
JP    2000-9735 A    1/2000
(Continued)

OTHER PUBLICATIONS

Office Action dated Oct. 10, 2017, issued in counterpart Japanese Application No. 2014-100925, with English translation. (12 pages).
(Continued)

*Primary Examiner* — Benjamin R Whatley
(74) *Attorney, Agent, or Firm* — Westerman, Hattori, Daniels & Adrian, LLP

(57) ABSTRACT

An analyzing apparatus is disclosed that is capable of preventing an intentional or negligent interventional action on an analysis. An analyzing apparatus 1 is connected to a controlling computer 2 and performs a predetermined analysis according to a control instruction given through the controlling computer 2. The analyzing apparatus 1 includes an operation unit 11 for enabling a user to perform an input operation for controlling the analyzing apparatus 1. When the analyzing apparatus 1 is under control of the controlling computer 2, the input operation performed through the operation unit 11 is disabled.

8 Claims, 4 Drawing Sheets

(56) References Cited

U.S. PATENT DOCUMENTS

| | | | | |
|---|---|---|---|---|
| 2010/0271479 A1* | 10/2010 | Heydlauf | .........  | G01N 33/54366 |
| | | | | 348/143 |
| 2013/0161244 A1 | 6/2013 | Ishii et al. | | |
| 2013/0191756 A1* | 7/2013 | Kihara | ................... | G06F 3/0484 |
| | | | | 715/740 |
| 2013/0243652 A1* | 9/2013 | Nishigaki | ........ | G01N 35/00584 |
| | | | | 422/68.1 |
| 2014/0172184 A1* | 6/2014 | Schmidt | ................ | G05B 15/02 |
| | | | | 700/295 |

FOREIGN PATENT DOCUMENTS

| | | | |
|---|---|---|---|
| JP | 2000-311146 A | | 11/2000 |
| JP | 2003-121449 A | | 4/2003 |
| JP | 2003121449 A | * | 4/2003 |
| JP | 2003-185670 A | | 7/2003 |
| JP | 2006-125918 A | | 5/2006 |
| JP | 2008-268048 A | | 11/2008 |
| JP | 2012-32307 A | | 2/2012 |
| JP | 2012-63283 A | | 3/2012 |
| JP | 2013-148519 A | | 8/2013 |
| JP | 5406809 B2 | | 2/2014 |

OTHER PUBLICATIONS

Office Action dated Jun. 15, 2017, issued in counterpart Chinese Application No. 201510236387.5, with English translation. (15 pages).

Office Action dated Apr. 3, 2018, issued in counterpart Japanese Application No. 2014-100925, with English machine translation. (11 pages).

* cited by examiner

SAMPLE ANALYZING SYSTEM

TECHNICAL FIELD

The present invention relates to an analyzing apparatus equipped with an operation unit for receiving an operation by a user, the analyzing apparatus being connected to a controlling computer.

BACKGROUND ART

Analyzing apparatuses for performing a predetermined analysis on a given sample to obtain information about components and a structure of the sample are used in a variety of fields such as development of medicines and foods, medical treatment, environmental investigation, and basic research.

Such an analyzing apparatus is provided with a door that enables a user to open or close for setting a sample container and replace parts of the apparatus. During an analysis and preparation for the analysis, the door is opened or closed only in the case of, for example, adding a sample container, in order to securely maintain analysis conditions such as the temperature inside of the apparatus. Depending on an operating state of an analyzing apparatus, the user may inadvertently touch a part of the apparatus with his/her finger to break the part or himself/herself may be injured. Hence, an analyzing apparatus having a function of automatically locking the door of the analyzing apparatus under such a high-risk condition is disclosed (for example, Patent Literature 1).

In many cases, an analyzing apparatus is connected to a computer such as a personal computer (PC) or a workstation, and is controlled through the computer. Further, along with the increased use of a touch panel as a user interface (UI) in recent years, many analyzing apparatus are equipped with an operation unit for receiving a certain level of control operation through the touch panel. The operation unit attached to the analyzing apparatus is useful in the condition where the user operates the analyzing apparatus for the purpose of maintenance and operation checking. Specifically, in the condition where a failure of the analyzing apparatus is suspected, for example, where acquired data is significantly different from what the user expected, the user desires to visually examine the operations of the analyzing apparatus while changing various setting values. In such a case, it is not efficient for the user to move between the controlling computer and the analyzing apparatus each time in order to change the setting values and examine the operation of the analyzing apparatus. The controlling computer and the analyzing apparatus are installed in different rooms in many cases, and hence the travel between the two is troublesome to the user. In view of this, the analyzing apparatus equipped with the above-mentioned operation unit is useful in that it enables the user to easily change the setting values and examine the operation of the analyzing apparatus in one place.

A series of analysis is one of normal operations on an analyzing apparatus, and such a series of analysis work takes a long time in many cases. In such case, the user may interrupt the analysis work at appropriate timing, and turn off the analyzing apparatus in order to prevent wearing of parts and save power consumption. In some analyzing apparatus, further, it is designed that the power is automatically turned off after a predetermined time in case of no input operation supposing such a case that the user wants to go home while an analysis is still running but is expected to finish soon, and wants to start another analysis after that.

CITATION LIST

Patent Literature

[Patent Literature 1] JP 5406809 B

SUMMARY OF INVENTION

Technical Problem

A problem arises to such an analyzing apparatus connected to a controlling computer and equipped with the above-mentioned operation unit when a person other than the operator of the analyzing apparatus performing a given analysis performs some interventional action from the operation unit, the given analysis is not performed properly.

Some of the above-mentioned interventional action are described with specific examples.

First, an example of an accidental interventional action by another user of the analyzing apparatus is considered. A second user other than a first user who is the operator that has finished the latest analysis cannot know at first sight whether the analyzing apparatus in the power-off state as described above is in the interval of successive analysis works by the first user, or in an unoccupied state (or in a state just after any analysis work is completed). It is difficult in such a case to judge whether it is allowable to change setting conditions or calibration information from the operation unit of the analyzing apparatus in order to prepare for a new analysis work. If the second user errs in this judgment, unfavorable influences may be brought into the interrupted latest analysis work.

In order to know whether the analyzing apparatus in a power-off state is in the interval of successive analysis works or in an unoccupied state, the second user needs to go to the controlling computer connected to the analyzing apparatus, and check the state of an analysis control application or other operating states of the analyzing apparatus. However, as described above, the analyzing apparatus and the controlling computer are often separated in distant places, so that such status checking is bothering to the user.

Here, in order to enable the checking, on site, of whether the analyzing apparatus is in use, it is possible to configure the analyzing apparatus such that, for example, a note or the like announcing that a user is using the analyzing apparatus is shown on the display of the analyzing apparatus, whereby the second user could know the status. However, this configuration is still short of preventing a wilful operation by another described before. That is, for example, if someone tries to change, from the operation unit of the analyzing apparatus, setting conditions or calibration information about the analysis without telling the first user for the purpose of producing erroneous analysis results, the display of the status of use does not work as a deterrent against the wilful operation. Such a wilful action by another is a serious risk particularly in development of medicines, and the demand for a configuration capable of reducing this risk is increasing.

The present invention, which has been made in view of the above-mentioned problems, has an object to provide an analyzing apparatus capable of preventing an intentional or negligent interventional action on an analysis.

Solution to Problem

In order to solve the above-mentioned problems, an analyzing apparatus according to the present invention includes: an analyzing unit connected to a controlling computer for performing a predetermined analysis according to a control instruction given through the controlling computer; an operation unit for enabling a user to perform an input operation for controlling the analyzing unit; a communication unit for communicating with the controlling computer; and an operation locking unit for disabling the input operation performed through the operation unit when the communication unit is in communication with the controlling computer.

The expression "when the communication unit is in communication with the controlling computer" means that the analyzing unit is under control of the controlling computer.

According to the above-mentioned configuration, the analyzing apparatus can be controlled by both of the control instruction given through the controlling computer and the input operation performed through the operation unit whereas the input operation performed through the operation unit is disabled when the analyzing unit is under control of the controlling computer. That is, under control of the controlling computer, the operation unit is locked, and it becomes impossible to control the analyzing unit from the operation unit.

Because the analyzing unit of the analyzing apparatus is generally controlled through the controlling computer, an action of trying to control the analyzing unit under control of the controlling computer from the operation unit is considered to be highly likely to be an interventional action by another person. Accordingly, when the analyzing unit is under control of the controlling computer, control of the analyzing unit from the operation unit is made impossible, whereby an intentional or negligent interventional action on the analyzing unit can be prevented.

Desirably, in the analyzing apparatus, the operation locking unit enables the input operation performed through the operation unit when the user gives an unlock instruction through the controlling computer.

According to the above-mentioned configuration, in the case where the user who uses the controlling computer, that is the operator of the analysis, judges as appropriate, the control by the input operation performed through the operation unit can be permitted by giving the unlock instruction. Consequently, in the case where the user desires to operate the analyzing apparatus for the purpose of maintenance, even when the analyzing unit is under control of the controlling computer, the analyzing unit can be operated using the operation unit.

Preferably, the analyzing apparatus further includes an analysis controller for causing the analyzing unit to change to a waiting state while maintaining the state where the input operation performed through the operation unit is disabled when an instruction through the controlling computer is not given for a predetermined time, where the waiting state is a state for reducing power consumption and/or wearing of parts included in the analyzing unit.

The waiting state of the present invention refers to a state where power supply to the analyzing unit is not cut and where predetermined standby power is supplied to some electric circuit board on which a CPU, a memory and the like are mounted. The waiting state of the present invention also includes a state where part of functions of the analyzing unit is stopped.

According to the above-mentioned configuration, the analyzing unit is changed to the waiting state when the user stops the analyzing unit for a predetermined period or longer for the reason of interruption of analysis work or the like, whereby power consumption and wearing of parts can be suppressed, in addition to preventing an interventional action by another person.

The analyzing apparatus of the present invention may further include a switching operation unit for enabling the user to perform an input operation for bringing the analyzing unit into the waiting state. The operation locking unit may disable the input operation performed through the switching operation unit, when the analyzing unit is in a specific operating state.

Some analyzing apparatuses take a long time to perform a preparatory actions, and an analysis cannot be started immediately. In view of this, the following analyzing apparatus is provided. That is, the user calculates the time required for the preparatory actions beforehand, and sets the time to change to the preparatory state using the calculated time, whereby the analyzing apparatus automatically changes from the waiting state to the preparatory state at the set time, and an adequate preparatory actions can be done before the analysis.

For such an analyzing apparatus in which the analyzing unit in the waiting state changes from the waiting state to the preparatory state, which is a state ready for an analysis, according to an instruction given through the controlling computer, the preparatory state may be included in the specific operating state. According to this configuration, the analysis can be started immediately at the time of starting to use the controlling computer while an interventional action by another can be prevented.

Advantageous Effects of Invention

The analyzing apparatus according to the present invention configured as described above prevents an intentional or negligent interventional action on an analysis.

DESCRIPTION OF EMBODIMENTS

Hereinafter, an embodiment mode of the present invention is described in detail with reference to the drawings. In the following description, members having the same functions as those in previously described drawings are denoted by the same reference signs, and description thereof is omitted.

Figure 1:
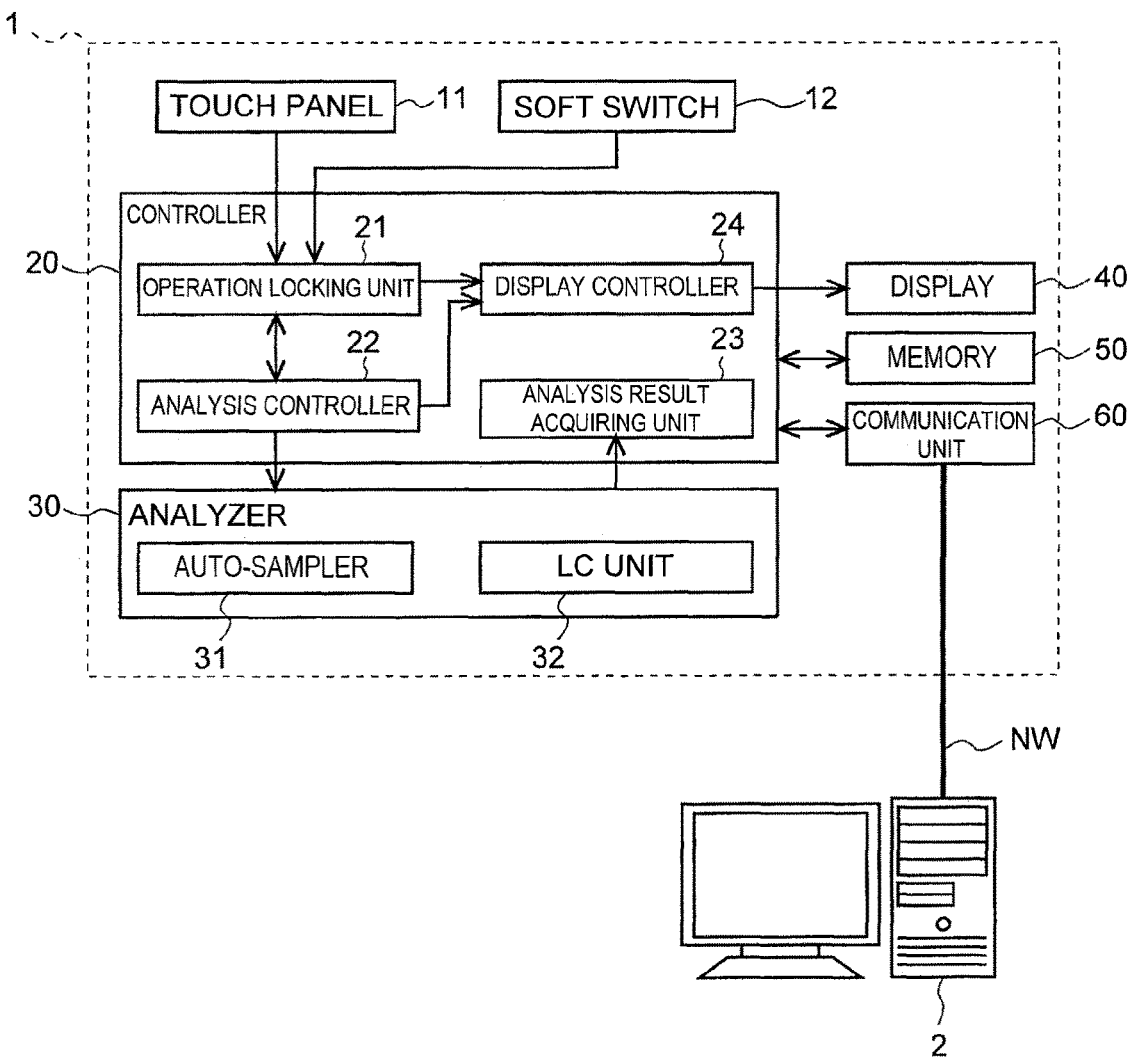
FIG. 1 is a block diagram showing a schematic configuration of a sample analyzing system including an analyzing apparatus according to an embodiment mode of the present invention.

FIG. 1 is a block diagram showing a schematic configuration of a sample analyzing system including an analyzing apparatus according to an embodiment mode of the present invention. The sample analyzing system according to the present embodiment mode includes an analyzing apparatus 1 and a controlling computer 2 for managing analysis work performed by the analyzing apparatus 1 and analyzing and processing data obtained by the analyzing apparatus 1, the controlling computer 2 being connected to the analyzing apparatus 1.

In the present embodiment mode, the analyzing apparatus 1 is a liquid chromatograph system (LC). Not limited to the liquid chromatograph system (LC), the analyzing apparatus 1 may be a liquid chromatograph mass spectrometer (LC-MS), a gas chromatograph system (GC), a gas chromatograph mass spectrometer (GC-MS), or a spectrophotometer. The analyzing apparatus 1 may be another experimental equipment or medical equipment, and any measurement technique and any measurement target are possible for the analyzing apparatus 1 as long as the analyzing apparatus 1 is an analyzing apparatus that can be controlled by an external computer and has a configuration corresponding to an operation unit to be described later.

As shown in FIG. 1, the analyzing apparatus 1 includes an operation unit or a touch panel 11 (corresponding to the operation unit of the present invention), a switching operation unit or a soft switch 12, a controller 20, an analyzing unit 30, a display 40, a memory 50, and a communication unit 60.

The analyzing apparatus 1 has "Main-Power-Off", "Standby", "Stabilization", "Ready", and "Analysis" as its operating states, and makes the transition among these states in response to an event as a trigger, such as an instruction given by a user.

"Main-Power-Off" is a state where power supply is completely cut and where the analyzing apparatus 1 does not receive any control from an input operation and an external apparatus. "Standby" is a power saving mode for suppressing power consumption and wearing of parts, and is a state where standby power is supplied to only some substrates on which a CPU, a memory, and the like are mounted. "Standby" corresponds to a waiting state of the present invention. The connection between the analyzing apparatus 1 and the controlling computer 2 is maintained even during the standby state, but power supply to the display 40 is cut, and hence the screen of the display 40 is blank similarly to the main-power-off state. "Stabilization" is a preparatory state until a column and a light source are stabilized in a state suitable for an analysis. "Ready" is a state where the stabilization is completed and where the user can start the analysis at arbitrary timing. "Analysis" is a state where a variety of operations are performed, the variety of operations including introduction of a mobile phase into a column, collection and injection of a sample, and detection of absorbance in the case of the LC. When the analyzing apparatus 1 is in the stabilization, ready, or analysis state, a variety of conditions currently set for the analysis may be displayed on the screen of the display 40 as a display image of a predetermined analysis control application.

In addition to these states, the analyzing apparatus 1 may further have, for example, "Neutral" as its operating state when the analyzing apparatus 1 is activated with no analysis condition being set through the controlling computer 2. "Neutral" is a state where the image of the analysis control application is displayed on the screen of the display 40 and where a touch operation on the touch panel 11 by the user is received.

Among the operating states, "Main-Power-Off", "Standby", and "Neutral" are operating states of the entire analyzing apparatus 1 including the analyzing unit 30, and "Stabilization", "Ready", and "Analysis" are operating states of the analyzing unit 30.

The touch panel 11 is for detecting a touch by the user (a contact or approach of an instructing object), and is realized by a capacitive or resistive touch panel. The touch panel 11 includes a controller integrated circuit (IC) (not shown), and outputs touch position coordinates of the instructing object identified by the controller IC, as an input signal to the controller 20.

The soft switch 12 is a switch controlled by software. If the soft switch 12 is pressed by the user, the soft switch 12 outputs a press signal to the controller 20. Pressing of the soft switch 12 triggers cancelling of the standby state of the analyzing apparatus 1, and also triggers the transition of the analyzing apparatus 1 to the standby state when the soft switch 12 is not locked.

Figure 2:
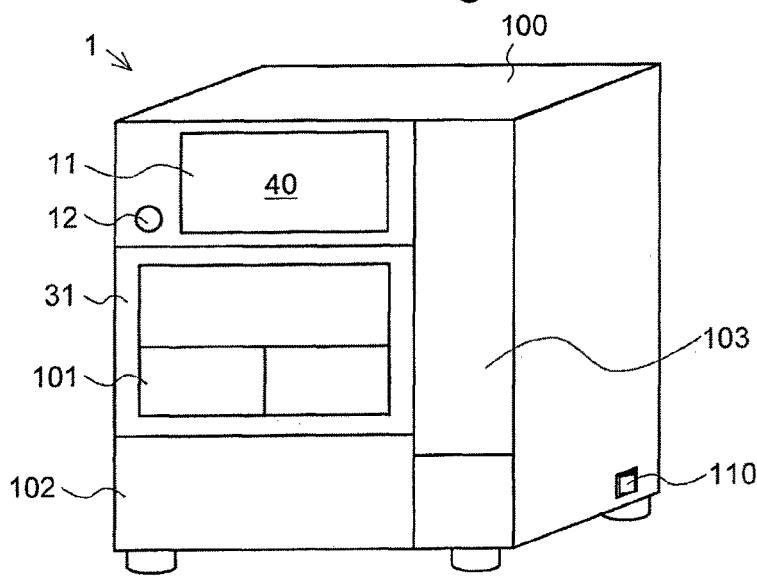
FIG. 2 is a perspective view showing an external appearance of the analyzing apparatus shown in FIG. 1.

FIG. 2 shows an external appearance of the analyzing apparatus 1. As shown in FIG. 2, the analyzing apparatus 1 includes the touch panel 11 and the soft switch 12. The touch panel 11 is provided integrally with the display 40.

Further, a main power switch 110 for switching on/off the main power is provided on a side surface or a back surface of a main body 100. The main power switch 110 is realized by, for example, a rocker switch or a push-button switch. The user can turn off the main power by operating the main power switch 110, regardless of the operating state of the analyzing apparatus 1. For example, the case where urgent maintenance is necessary can be conceived as the condition where the main power switch 110 is operated.

Returning back to FIG. 1, the description is continued.

The analyzing unit 30 performs a predetermined analysis under control of the controller 20. The analyzing unit 30 includes an auto-sampler 31 and a LC unit 32.

The auto-sampler 31 collects a sample to be analyzed by the LC unit 32, and includes a needle for suctioning the sample from a sample container set on at least one sample rack 101 (see FIG. 2).

The LC unit 32 includes: a liquid feeding pump 102 (see FIG. 2) for feeding a mobile phase housed in a mobile phase container; a column oven 103 (see FIG. 2) including a heater for maintaining a column at a predetermined temperature; and a light source (not shown) and a detector (not shown) for detecting sample components sequentially eluted from the column.

The display 40 displays information handled by the analyzing apparatus 1, and is realized by, for example, a displaying apparatus such as a liquid crystal display (LCD). The display 40 is provided on the back side of the touch panel 11 so as to be superposed on the touch panel 11, and displays a graphical user interface (GUI) button and the like to assist a touch operation by the user on the touch panel 11.

The memory 50 non-transiently stores: control programs and an operating system (OS) program executed by the controller 20 of the analyzing apparatus 1; application programs for enabling the controller 20 to fulfil a variety of functions as the analyzing apparatus of the present invention; and a variety of pieces of data that are read out when the controller 20 executes the application programs. The memory 50 is realized by a non-volatile memory such as a read only memory (ROM), a flash memory, an erasable programmable ROM (EPROM), an electrically EPROM (EEPROM) (registered trademark), a hard disc drive (HDD), or a solid state drive (SSD).

The communication unit 60 is in charge of connection with an external apparatus and the like, and establishes connection between the analyzing apparatus 1 and the controlling computer 2 through a network cable NW (or a wireless local area network (LAN)).

The controller 20 integrally controls functions of elements included in the analyzing apparatus 1, and controls the operation of the analyzing apparatus 1. The controller 20 is realized by, for example, a central processing unit (CPU), and each element (to be described later) included in the controller 20 is realized by reading a program stored in the memory 50 onto a memory (not shown) made of a volatile memory such as a RAM and executing the program by the CPU as the controller 20.

As shown in FIG. 1, the controller 20 includes an operation locking unit 21, an analysis controller 22, an analysis result acquiring unit 23, and a display controller 24 as its functional blocks.

The operation locking unit 21 disables an input operation performed through the touch panel 11, when the analyzing apparatus 1 is under control of the controlling computer 2. Specifically, when the connection between the communication unit 60 and the controlling computer 2 is established, the operation locking unit 21 makes the transition to a touch panel locking state for disabling an input signal acquired from the touch panel 11. When the connection between the communication unit 60 and the controlling computer 2 is not established, the operation locking unit 21 outputs the input signal to the analysis controller 22. It is preferable that, when the operation locking unit 21 is in the touch panel locking state, the operation locking unit 21 display a notification image to that effect on the screen of the display 40 through the display controller 24.

The operation locking unit 21 further disables an input operation performed through the soft switch 12, when the analyzing apparatus 1 is in a predetermined operating state. Specifically, the operation locking unit 21 identifies the current operating state of the analyzing apparatus 1 based on a transition signal acquired from the analysis controller 22 to be described later. Then, in the case where the identified operating state is any of one or more predetermined operating states, the operation locking unit 21 makes the transition to a soft switch locking state for disabling a press signal acquired from the soft switch 12. In the case where the identified operating state is not any of the one or more operating states, the operation locking unit 21 outputs the press signal to the OS (not shown).

The analysis controller 22 controls the operation of the analyzing unit 30 such that an analysis designated by the user is appropriately performed. Specifically, the analysis controller 22 outputs a predetermined drive signal to the analyzing unit 30 based on analysis conditions and the like that are acquired from the controlling computer 2 through the communication unit 60. At the time of the transition from one operating state to another operating state among the plurality of operating states, the analysis controller 22 further outputs a transition signal for notification of the another operating state after the transition, to the operation locking unit 21.

The analysis controller 22 displays current set values, a predetermined GUI button, and the like on the screen of the display 40 through the display controller 24. Then, when the analysis controller 22 acquires, from the operation locking unit 21, an input signal indicating a touch operation on the touch panel 11 within the display region of the predetermined GUI button, the analysis controller 22 changes the set values and outputs a predetermined drive signal, based on the input signal. That is, the analyzing apparatus 1 is configured to be capable of performing an analysis also in response to an input operation through the touch panel 11. This configuration is mainly used when the user changes the set values while visually checking the operation of the apparatus, for maintenance of the analyzing apparatus 1.

The analysis result acquiring unit 23 acquires an analysis result obtained through an analysis performed by the analyzing unit 30. The analysis result acquired by the analysis result acquiring unit 23 may be sent out to the controlling computer 2 through the communication unit 60, and may be stored in the memory 50. Alternatively, the analysis result may be converted into a graph or the like to be displayed as an image on the screen of the display 40 through the display controller 24.

The display controller 24 outputs video signals of a variety of pieces of information processed by the controller 20, to the display 40. Specifically, the display controller 24 displays setting conditions and calibration information managed by the analysis controller 22 as images on the screen of the display 40, and also displays the GUI button and the like.

The controlling computer 2 is an external apparatus for controlling the analyzing apparatus 1 to perform a predetermined analysis. The controlling computer 2 is a computer such as a PC or a workstation, and an analysis control application for controlling the analyzing apparatus 1 is installed in the controlling computer 2. The user can set analysis conditions on this application, and can instruct the analyzing apparatus 1 to perform an analysis according to the set analysis conditions.

Locking and Unlocking of Touch Panel 11

An example flow of a locking process and an unlocking process on the touch panel 11 by the operation locking unit 21 is described with reference to a flowchart shown in FIG. 3.

First, the operation locking unit 21 determines whether or not the analyzing apparatus 1 is connected to the controlling computer 2 (Step S101). Specifically, the operation locking unit 21 makes an inquiry to the communication unit 60 to determine whether or not the connection to the controlling computer 2 is established.

If the analyzing apparatus 1 is connected to the controlling computer 2 (Yes in Step S101), the operation locking unit 21 locks the touch panel 11 (Step S102). Specifically, the operation locking unit 21 makes the transition to the touch panel locking state for disabling an input signal acquired from the touch panel 11. Then, the operation locking unit 21 returns to before Step S101, and waits while remaining in the touch panel locking state, until determination of the next connection state.

On the other hand, if the analyzing apparatus 1 is not connected to the controlling computer 2 (No in Step S101), the operation locking unit 21 cancels the touch panel locking state to unlock the touch panel 11 (Step S103), and returns to before Step S101.

Locking and Unlocking of Soft Switch 12

An example flow of a locking process and an unlocking process on the soft switch 12 by the operation locking unit 21 is described with reference to a flowchart shown in FIG. 4. Now, it is assumed that the analyzing apparatus 1 makes the transition from one operating state to another operating state in response to control through the controlling computer 2.

First, the operation locking unit 21 identifies the current operating state of the analyzing apparatus 1 (Step S201). Specifically, the operation locking unit 21 acquires a transition signal that is outputted by the analysis controller 22 when the analysis controller 22 makes the transition from one operating state to another operating state, and identifies the current operating state of the analyzing apparatus 1 based on the acquired transition signal.

Subsequently, the operation locking unit 21 determines whether or not the current operating state is included in predetermined operating states (Step S202). Specifically, the operation locking unit 21 determines whether or not the operating state identified in Step S201 is included in one or more operating states that are set in advance as a condition for locking the soft switch 12 and are stored in the memory 50.

If the current operating state is included in the predetermined operating states (Yes in Step S202), the operation locking unit 21 locks the soft switch 12 (Step S203). Specifically, the operation locking unit 21 makes the transition to the soft switch locking state for disabling a press signal acquired from the soft switch 12. Then, the operation locking unit 21 returns to before Step S201, and waits while remaining in the soft switch locking state, until acquisition of the next transition signal.

On the other hand, if the current operating state is not included in the predetermined operating states (No in Step S202), the operation locking unit 21 cancels the soft switch locking state to unlock the soft switch 12 (Step S204), and returns to before Step S201.

According to the processing described above, when the analyzing apparatus 1 is connected to the controlling computer 2, the operation locking unit 21 comes into the touch panel locking state, and disables an input operation through the touch panel 11. In other words, when the analyzing apparatus 1 is under control of the controlling computer 2, it becomes impossible to interfere with the operation of the analyzing unit 30 by operating the touch panel 11. Because the analyzing apparatus 1 is controlled through the controlling computer 2 in a normal use condition, the probability that control from the touch panel 11 is an interventional action by another person is estimated to be high. Accordingly, such a configuration as described above prevents an intentional or negligent interventional action on an analysis.

Moreover, when the analyzing apparatus 1 is in a predetermined operating state, the operation locking unit 21 comes into the soft switch locking state, and disables pressing of the soft switch 12. This can prevent, for example, the following trouble: in the case where the soft switch 12 is pressed in the course of analysis work, the analyzing apparatus 1 makes the transition to the standby state, and the analysis work is unexpectedly interrupted.

The predetermined operating state may be set at the time of manufacturing the analyzing apparatus 1, and may be changeable by the user. The change by the user is desirably made through the controlling computer 2, but may be possible through the touch panel 11 by performing a specific operation. In the latter case, for example, the change is permitted by touching a plurality of points (multi-touch) or inputting a predetermined password, whereby a condition for locking the soft switch 12 can be prevented from being changed due to an erroneous operation and the like.

Embodiments

Figure 5:
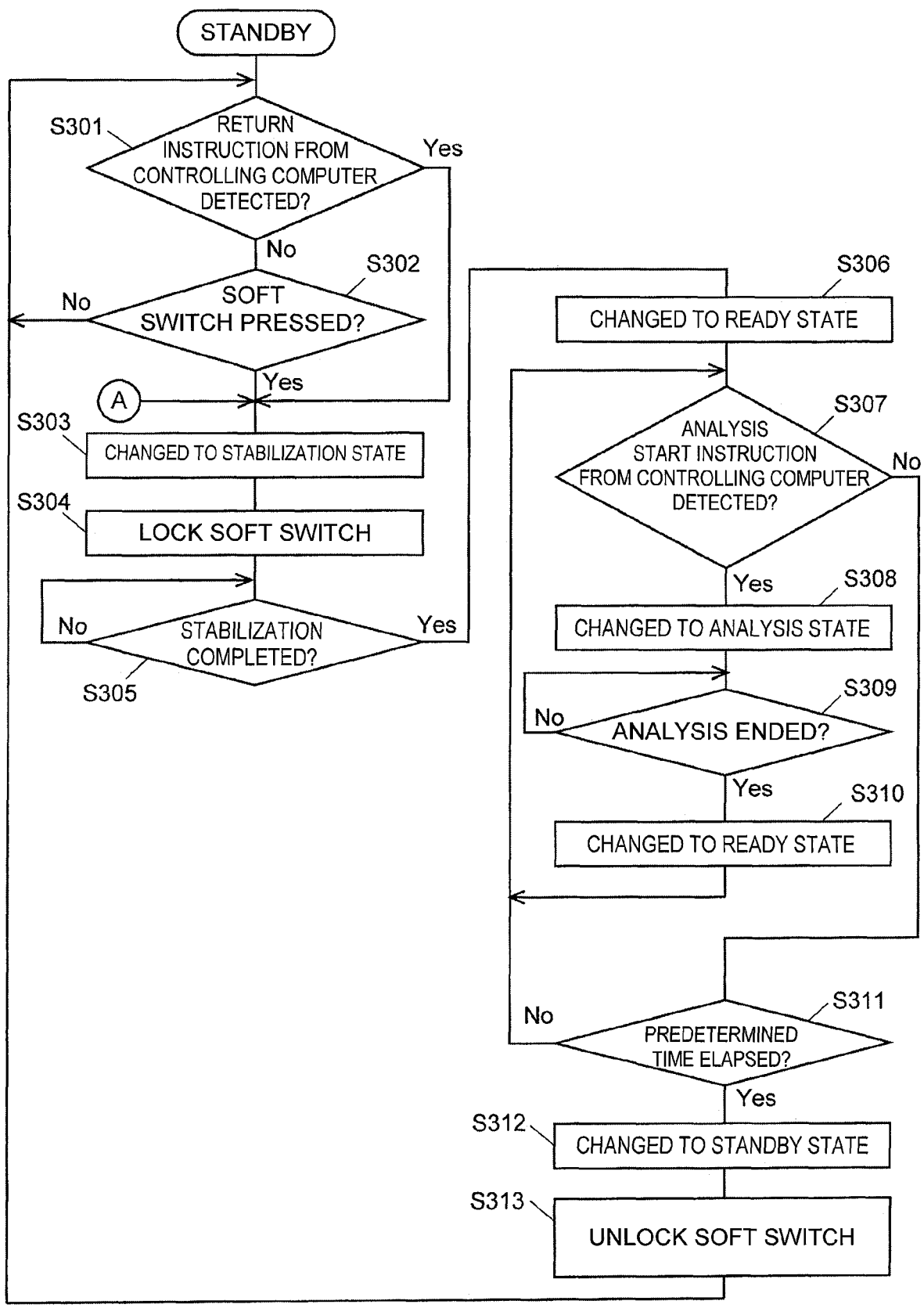
FIG. 5 is a flowchart showing an example flow of a process in the case where the analyzing apparatus shown in FIG. 1 performs analysis work under control of a controlling computer.

Description is given below of an embodiment in which, in the present embodiment mode, the predetermined operating states, that is, the operating states set as a condition for causing the analyzing apparatus 1 to lock the soft switch 12 are defined as three states of "Stabilization", "Ready", and "Analysis". FIG. 5 is a flowchart showing an example flow of a process performed by the analyzing apparatus 1 when analysis work is performed under control of the controlling computer 2. Now, the user has completed settings of analysis conditions on the controlling computer 2 in advance, and the analyzing apparatus 1 is held in the standby state. Because the analyzing apparatus 1 is connected to the controlling computer 2, the touch panel 11 is always locked according to the process described above with reference to FIG. 3.

Figure 6:
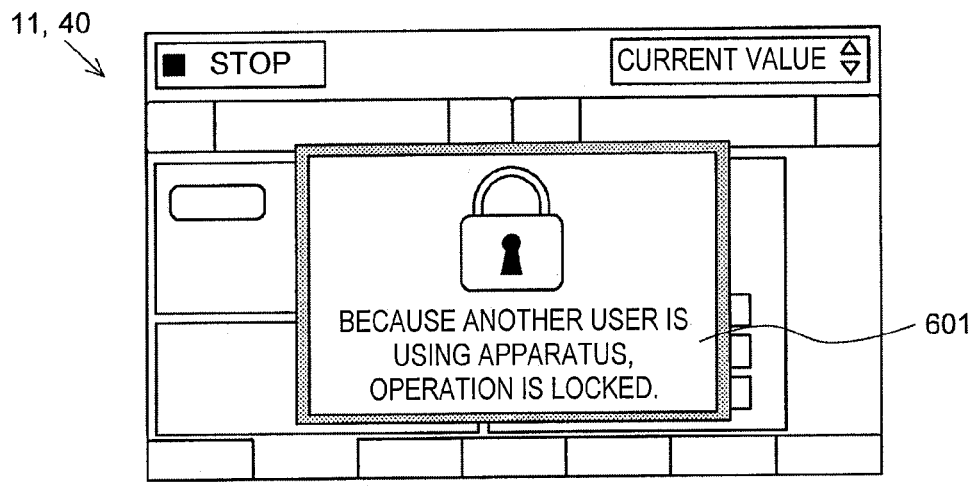
FIG. 6 is a screen display example of a display when the touch panel is locked in the analyzing apparatus shown in FIG. 1.

First, if a standby cancel instruction from the controlling computer 2 or pressing of the soft switch 12 is detected (Yes in any of Step S301 and Step S302), the analyzing apparatus 1 makes the transition to the stabilization state (Step S303), and locks the soft switch 12 (Step S304). Specifically, if any of these events is detected, the analysis controller 22 outputs predetermined drive signals to the auto-sampler 31 and the LC unit 32, and thus controls the analyzing unit 30 such that a column, a light source, and the like are stabilized in a state suitable for an analysis. At this time, the analysis controller 22 further outputs a transition signal to the operation locking unit 21, whereby the operation locking unit 21 makes the transition to the soft switch locking state, according to Steps S201 to S203 shown in FIG. 4. When the analyzing apparatus 1 makes the transition to the stabilization state, that is, cancels the standby state in Step S303, the operation locking unit 21 may display, for example, such a notification image 601 as shown in FIG. 6 on the screen of the display 40 through the display controller 24, in order to notify the user who is in the installation place of the analyzing apparatus 1 that the touch panel 11 (and the soft switch 12) are locked. Alternatively, the operation locking unit 21 may display an image (such as a mark) to the same effect around an end area within the screen of the display 40.

On the other hand, if neither the standby cancel instruction from the controlling computer 2 nor the pressing of the soft switch 12 is detected (No in both Step 5301 and Step S302), the analyzing apparatus 1 remains in the standby state until any of these events is detected.

The standby cancel instruction from the controlling computer 2 is not limited to an active instruction by the user. For example, activation of an analysis control application running on the controlling computer 2 may be defined as the standby cancel instruction, that is, as a transition trigger for the stabilization state.

If the stabilization is completed (Yes in Step S305), the analyzing apparatus 1 makes the transition to the ready state (Step S306), and maintains the states of the column and the light source. Subsequently, if an analysis start instruction from the controlling computer 2 is detected (Yes in Step S307), the analyzing apparatus 1 makes the transition to the analysis state (Step S308), and operates each unit of the analyzing unit 30 to perform a predetermined analysis. If the analysis is ended (Yes in Step S309), the analyzing apparatus 1 makes the transition to the ready state again (Step S310), returns to before Step S307, and waits for the next analysis start instruction.

After the transition to the ready state in Step S306 or S310, if a predetermined time elapses with no analysis start instruction from the controlling computer 2 being detected (No in Step S307 and Yes in Step S311), the analyzing apparatus 1 makes the transition to the standby state (Step S312), and unlocks the soft switch 12 (Step S313). Specifically, the analysis controller 22 changes the drive signals outputted to the analyzing unit 30 to safely stop the operation of the analyzing unit 30, and outputs a transition signal for the standby state to the operation locking unit 21. Moreover, the controller 20 stops power supply to the display 40. The operation locking unit 21 cancels the soft switch locking state according to Steps S201, S202, and S204 shown in FIG. 4. Then, the process returns to before Step S301, and the analyzing apparatus 1 waits for a transition trigger for the next stabilization (that is, a standby cancel trigger). It is preferable that the time as a criterion for the determination in Step S311 be defined as a period adequate to determine that the user interrupts the use of the controlling computer 2.

Figure 4:
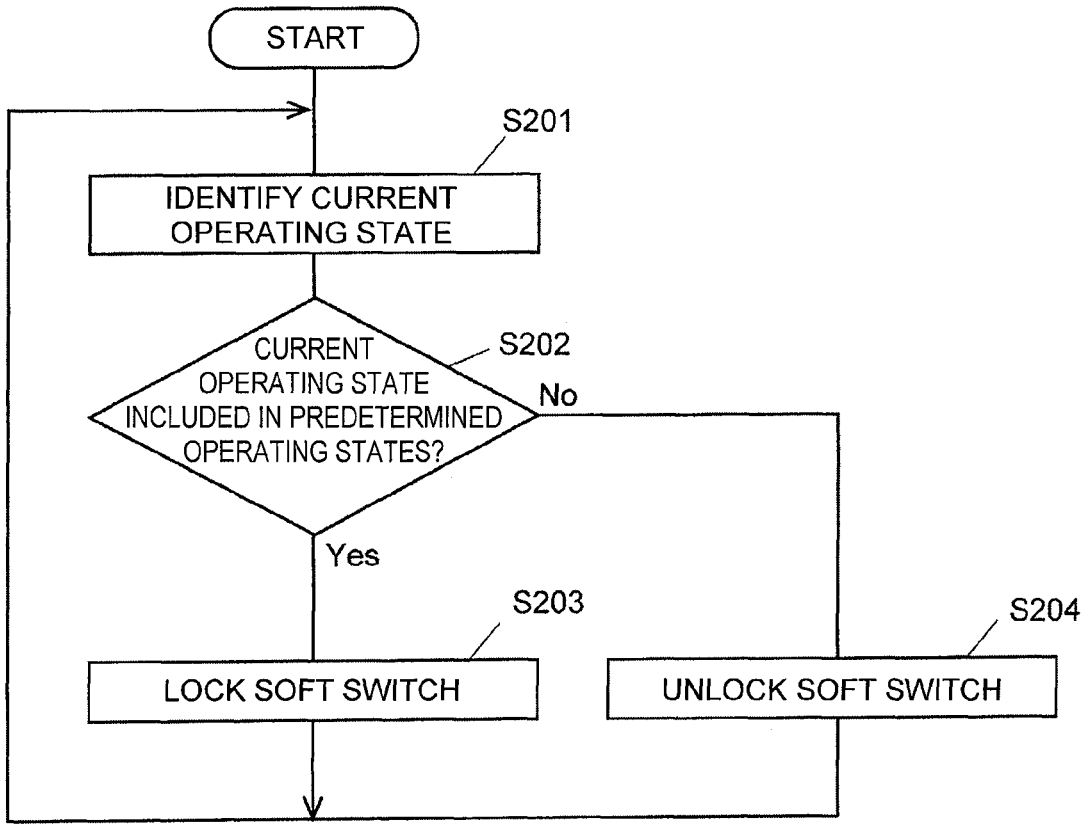
FIG. 4 is a flowchart showing an example flow of a locking process and an unlocking process on a soft switch by the analyzing apparatus shown in FIG. 1.

Although not shown in FIG. 5, Steps S201 to S203 shown in FIG. 4 are performed after Steps S306, S308, and S310, whereby the operation locking unit 21 remains in the soft switch locking state.

According to the present embodiment, after the transition from the standby state to the stabilization state, the soft switch 12 is always locked until the analyzing apparatus 1 makes the transition to the standby state again due to the elapse of a predetermined time from the end of an analysis. That is, after the start of a series of operations concerning an analysis designated by the user of the controlling computer 2, it becomes impossible to press the soft switch 12 to cause the analyzing apparatus 1 to make the transition to the standby state. This can prevent the series of analysis work from being unexpectedly interrupted.

Moreover, because the touch panel 11 is always locked when the analyzing apparatus 1 is connected to the controlling computer 2, an interventional action that another person interferes with analysis results by operating the touch panel 11 can be effectively prevented.

Further, because the analyzing apparatus 1 is connected to the controlling computer 2 even during the standby state, if the user holds the analyzing apparatus 1 in the standby state in the course of the analysis work, the locking of the touch panel 11 is maintained, so that power consumption and wearing of parts in the analyzing apparatus 1 can be suppressed while the above-mentioned interventional action can be prevented.

Moreover, in the present embodiment, the operating states set as the condition for locking the soft switch 12 do not include the standby state, and the analyzing apparatus 1 cancels the standby state and makes the transition to the stabilization state, in response to pressing of the soft switch 12.

Before the restart of the analysis work, the user who has interrupted the analysis work may move to the installation place of the analyzing apparatus 1 in some cases in order to, for example, visually check whether the sample set to the sample rack 101 has not been changed. In the case where the user judges that the restart of the analysis work is possible as a result of the checking, according to this configuration, the user can cancel the standby state of the analyzing apparatus 1 by pressing the soft switch 12, and can move to the installation place of the controlling computer 2 during the time-consuming stabilization, whereby the efficiency of the analysis work can be improved.

In the flowchart shown in FIG. 5, after the analyzing apparatus 1 cancels the standby state and makes the transition to the stabilization state in Step S303, the user can cause the analyzing apparatus 1 to make the transition to the standby state at arbitrary timing by giving an instruction through the controlling computer 2. Moreover, a main-power-off operation performed by operating the main power switch 110 (see FIG. 2) is possible in whichever operating state the analyzing apparatus 1 is.

Moreover, although the flowchart of FIG. 5 is started from the standby state, in the case where the analyzing apparatus 1 in the main-power-off state is powered on by operating the main power switch 110, it is preferable that the analyzing apparatus 1 make the transition to the stabilization state (Step S303) without passing through the standby state.

Another Condition for Unlocking Touch Panel 11

Figure 3:
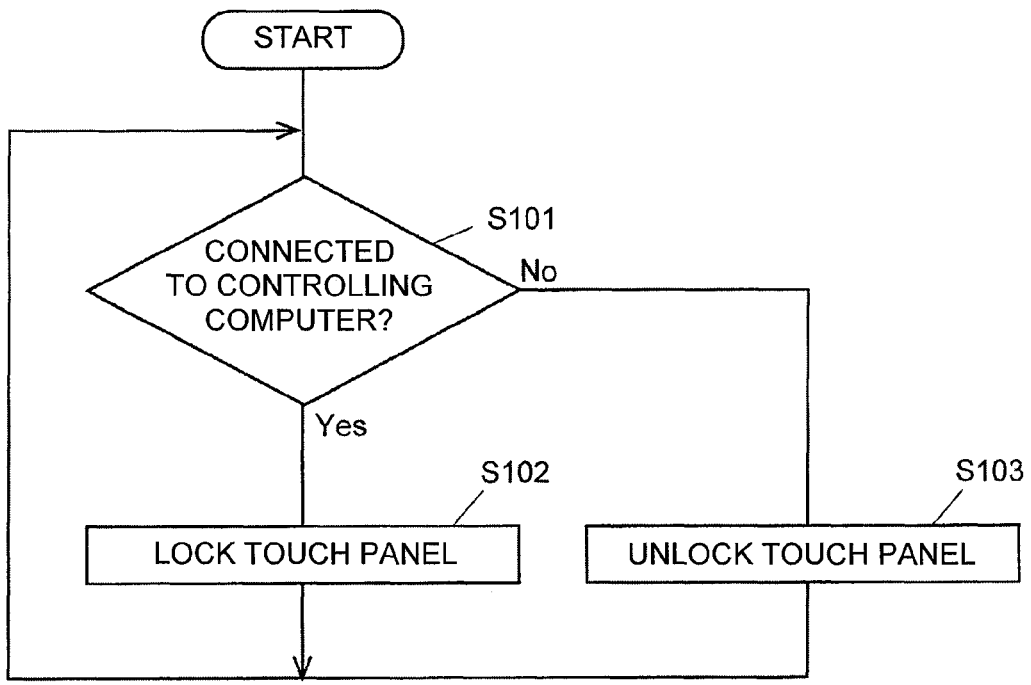
FIG. 3 is a flowchart showing an example flow of a locking process and an unlocking process on a touch panel by the analyzing apparatus shown in FIG. 1.
Figure 7:
FIG. 7 is a state transition diagram showing the transition between a touch panel unlocking state and a touch panel locking state based on an instruction from the controlling computer, of an operation unit included in the analyzing apparatus shown in FIG. 1.

The locking process and the unlocking process shown in FIG. 3 are based on the assumption of a normal use condition that the analyzing apparatus 1 performs a predetermined analysis under an instruction given through the controlling computer 2. However, for example, when the user checks pieces of data sequentially obtained during an analysis, in the case where the data is obviously different from what the user expected or where noise is excessively high, a failure of the analyzing apparatus is suspected in many cases. In such a condition, the user desires to control each unit of the analyzing unit 30 and visually check the operation of the analyzing apparatus 1, while operating the touch panel 11 provided to the analyzing apparatus 1, not from the controlling computer 2 installed in a distant place. In such a case, it is not efficient to disconnect the analyzing apparatus 1 from the controlling computer 2 each time in order to cancel or prevent the locking of the touch panel 11. Accordingly, it is preferable that, as shown in FIG. 7, the user can arbitrarily unlock the touch panel 11 by means of an unlock instruction from the controlling computer 2. If the unlocking is no longer necessary, the locking may be enabled again by means of a lock instruction from the controlling computer 2. It is preferable that the unlock instruction of this configuration also prohibit the locking of the soft switch 12 in the predetermined operating states.

Application

The stabilization takes time in many cases, and, for example, the stabilization of the light source of the LC unit 32 takes approximately 60 to 90 minutes. In view of this, according to an application for preventing the occurrence of waiting time for the stabilization, the analyzing apparatus 1 may cancel the standby state and may make the transition to the stabilization state at a time that is designated in advance by the controlling computer 2.

Figure 8:
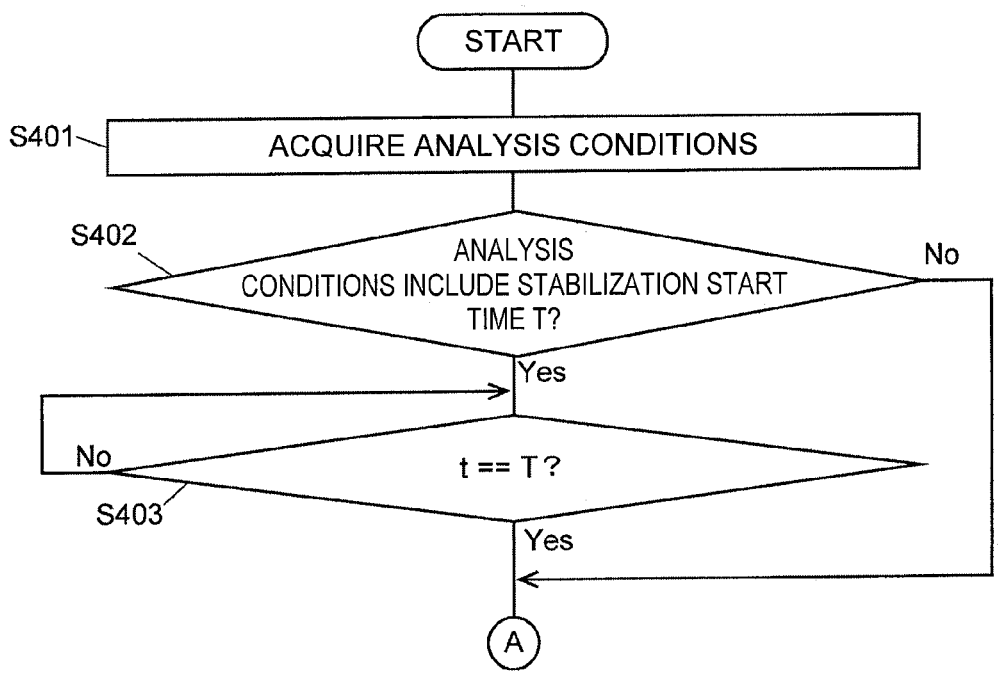
FIG. 8 is a flowchart showing a flow of a process of making the transition to a stabilization state at a time designated by the controlling computer in the analyzing apparatus shown in FIG. 1.

A specific example is described with reference to FIG. 8. First, the analysis controller 22 acquires analysis conditions concerning a predetermined analysis from the controlling computer 2 through the communication unit 60 (Step S401), and determines whether or not the analysis conditions include a stabilization start time T (Step S402). If the analysis conditions do not include the stabilization start time T (No in Step S402), the analysis controller 22 causes the analyzing apparatus 1 to make the transition to the stabilization state in Step S303 shown in FIG. 5. On the other hand, if the analysis conditions acquired in Step S401 include the stabilization start time T (Yes in Step S402), the analysis controller 22 does not immediately cause the analyzing apparatus 1 to make the transition to the stabilization state. At the moment at which a current time t coincides with the stabilization start time T (Yes in Step S403), the analyzing apparatus 1 is caused to start the stabilization in Step S303 (FIG. 5).

According to the present application, the user calculates the time required for the stabilization backwards from the time scheduled for the analysis start, and sets the calculation result as the transition time for the stabilization of the analyzing apparatus 1. In this way, the user can immediately start the analysis at the time of starting to use the controlling computer 2.

Other Modifications

In the embodiment mode, description is given of the configuration in which, based on the transition signal that is outputted by the analysis controller 22 when the analyzing apparatus 1 makes the transition from one operating state to another operating state, the operation locking unit 21 identifies the current operating state of the analyzing apparatus 1, and determines each time whether or not to lock the soft switch 12. In another configuration example, the operation locking unit 21 may define a transition signal for one operating state that is always taken first from among a plurality of operating states concerning a series of analysis work, as a transition trigger for the soft switch locking state. For example, in the embodiment, at the time of newly starting an analysis and restarting an analysis from the standby state, the analyzing apparatus 1 always passes through the stabilization state as a preparatory stage. Accordingly, the operation locking unit 21 may be configured to make the transition to the soft switch locking state if a transition signal outputted at the time of the transition to the stabilization state is detected. In this configuration, the operation locking unit 21 may define, for example, the transition signal outputted at the time of the transition to the standby state, as a cancel trigger for the soft switch locking state.

Moreover, in the embodiment described with reference to FIG. 5, pressing of the soft switch 12 is included in the events defined as a transition trigger from the standby state to the stabilization state, but only an instruction from the controlling computer 2 may be defined as the trigger. In this case, when the soft switch 12 is pressed, the notification image 601 shown in FIG. 6 may be displayed on the screen of the display 40 for a predetermined time, and then the analyzing apparatus 1 may make the transition to the standby state again.

Moreover, in the embodiment mode, the standby state is taken as an example of the waiting state for suppressing power consumption and wearing of parts in the analyzing apparatus 1, but, instead of the standby state, for example, the state where the entirety or a part of functions of the analyzing unit 30 are stopped while power supply to the display 40 is maintained may be defined as the waiting state of the present invention.

Moreover, in the embodiment mode, description is given of the configuration in which, when the analyzing apparatus 1 is connected to the controlling computer 2, the operation locking unit 21 disables all input signals acquired from the touch panel 11. In another modification, when the analyzing apparatus 1 is under control of the controlling computer 2, the operation locking unit 21 may selectively disable input signals that can change the operation of the analyzing unit 30, among input signals acquired from the touch panel 11. Specifically, for example, in a GUI that is displayed by the analysis controller 22 on the screen of the display 40 through the display controller 24, the operation locking unit 21 acquires information indicating the display region of a change button of analysis conditions, from the analysis controller 22, and disables a touch operation performed on the change button. In the present configuration example, in the case where the operation locking unit 21 acquires an input signal to be disabled, the notification image 601 shown in FIG. 6 may be displayed on the screen of the display 40 through the display controller 24.

If input operations locked by the operation locking unit 21 are limited as described above, even during analysis work, only operations having no influence on the analysis (for example, browsing of analysis results and currently applied analysis conditions) can be enabled by input operations from the touch panel 11, so that convenience for the user is improved.

Because the embodiment mode and the application and modifications thereof are given as mere examples of the present invention, even if the embodiment mode and the application and modifications thereof are appropriately changed, modified, added, or combined within the range of the gist of the present invention, the embodiment mode and the application and modifications thereof are obviously encompassed in the scope of claims of the present application.

REFERENCE SIGNS LIST

1 . . . Analyzing Apparatus
11 . . . Touch Panel
110 . . . Main Power Switch
12 . . . Soft Switch
2 . . . Controlling Computer
20 . . . Controller
21 . . . Operation Locking Unit
22 . . . Analysis Controller
23 . . . Analysis Result Acquiring Unit
24 . . . Display Controller
30 . . . Analyzing Unit
31 . . . Auto-Sampler
32 . . . LC Unit
40 . . . Display
50 . . . Memory
601 . . . Notification Image
60 . . . Communication Unit

The invention claimed is:
1. A sample analyzing system comprising:
an analyzing apparatus operable in an analysis state in which a predetermined analysis is performed for a sample or in a waiting state in which a standby power which is lower than a power supplied in the analysis state is supplied and an analysis is not being performed; and
a controlling computer that is provided separately from the analyzing apparatus, the analyzing apparatus comprising:
an analyzing unit configured to perform the predetermined analysis;
an operation unit configured to enable a user to perform an input operation for controlling the analyzing unit; and
a controller comprising a CPU configured to execute a program for, both in the analysis state and the waiting state, taking either a state of communicating with the controlling computer or a state of not communicating with the controlling computer, and for controlling the analyzing unit according to a control instruction given through the operation unit or a control instruction given through the controlling computer, wherein the controller is configured (1) to determine whether or not the controller is in communication with the controlling computer,
(2) to disable without operator intervention the input operation, both in the analysis state and the waiting state, performed through the operation unit in response to it being determined that the controller is in communication with the controlling computer, and
(3) to enable without operator intervention the input operation, both in the analysis state and the waiting state, performed through the operation unit in response to it being determined that the controller is not in communication with the controlling computer.

2. The sample analyzing system according to claim 1, wherein the controller enables the input operation performed through the operation unit when the user gives an unlock instruction through the controlling computer.

3. The sample analyzing system according to claim 1, wherein the controller is configured to cause the analyzing unit to make a transition to the waiting state while maintaining a state where the input operation performed through the operation unit is disabled, when an instruction through the controlling computer is not given for a predetermined time, where the waiting state is a state for reducing power consumption.

4. The sample analyzing system according to claim 2, wherein the controller is configured to cause the analyzing unit to make a transition to the waiting state while maintaining a state where the input operation performed through the operation unit is disabled, when an instruction through the controlling computer is not given for a predetermined time, where the waiting state is a state for reducing power consumption.

5. The sample analyzing system according to claim 3, further comprising a switching operation unit that is provided separately from the operation unit, and that is configured to enable the user to perform an input operation for bringing the analyzing unit into the waiting state, wherein the controller disables the input operation performed through the switching operation unit, when the analyzing unit is in a specific state.

6. The sample analyzing system according to claim 4, further comprising a switching operation unit that is provided separately from the operation unit, and that is configured to enable the user to perform an input operation for bringing the analyzing unit into the waiting state, wherein
the controller disables the input operation performed through the switching operation unit, when the analyzing unit is in a specific state.

7. The sample analyzing system according to claim 5, wherein
the analyzing unit in the waiting state changes from the waiting state to a stabilization state where a power higher than the standby power supplied in the waiting state is supplied to the analyzing unit, until the analyzing unit is stabilized in a state ready for an analysis, according to an instruction given through the controlling computer,
the stabilization state is included in the specific state, and
the predetermined analysis is not performed in the stabilization state.

8. The sample analyzing system according to claim 6, wherein
the analyzing unit in the waiting state changes from the waiting state to a stabilization state where a power higher than the standby power supplied in the waiting state is supplied to the analyzing unit, until the analyzing unit is stabilized in a state ready for an analysis, according to an instruction given through the controlling computer,
the stabilization state is included in the specific state, and
the predetermined analysis is not performed in the stabilization state.

\* \* \* \* \*